(12) United States Patent
Neff et al.

(10) Patent No.: US 9,375,848 B2
(45) Date of Patent: *Jun. 28, 2016

(54) ROBOTIC FINGER

(71) Applicants: Edward A. Neff, Cardiff-by-the-Sea, CA (US); Toan M. Vu, San Diego, CA (US); Johannes Theodorus Antonius van de Ven, Eindhoven (NL); Michael A. Ferris, Murrieta, CA (US); Naoyuki Okada, San Diego, CA (US); David D. Huang, Carlsbad, CA (US)

(72) Inventors: Edward A. Neff, Cardiff-by-the-Sea, CA (US); Toan M. Vu, San Diego, CA (US); Johannes Theodorus Antonius van de Ven, Eindhoven (NL); Michael A. Ferris, Murrieta, CA (US); Naoyuki Okada, San Diego, CA (US); David D. Huang, Carlsbad, CA (US)

(73) Assignee: Systems Machine Automation Components Corporation

( * ) Notice: Subject to any disclaimer, the term of this patent is extended or adjusted under 35 U.S.C. 154(b) by 0 days.

This patent is subject to a terminal disclaimer.

(21) Appl. No.: 13/927,075

(22) Filed: Jun. 25, 2013

(65) Prior Publication Data

US 2014/0159407 A1    Jun. 12, 2014

Related U.S. Application Data

(60) Provisional application No. 61/664,091, filed on Jun. 25, 2012, provisional application No. 61/664,675, filed on Jun. 26, 2012.

(51) Int. Cl.
*B66C 1/00* (2006.01)
*B66C 1/42* (2006.01)
*B25J 15/02* (2006.01)
*B25J 15/00* (2006.01)

(52) U.S. Cl.
CPC .......... *B25J 15/0206* (2013.01); *B25J 15/0009* (2013.01)

(58) Field of Classification Search
CPC ................ B25J 15/0009; B25J 15/0206
USPC .......... 294/104, 106, 65.5, 198, 902; 901/36, 901/38; 623/57, 64; 74/490.01, 490.03, 74/490.05
See application file for complete search history.

(56) References Cited

U.S. PATENT DOCUMENTS

| 4,576,421 A | 3/1986 | Teramachi |
| 4,616,886 A | 10/1986 | Teramachi |
| 4,693,676 A | 9/1987 | Inaba |
| 4,745,589 A | 5/1988 | Nomura |
| 4,799,803 A | 1/1989 | Tanaka |

(Continued)

FOREIGN PATENT DOCUMENTS

| DE | 2217958 A1 | 10/1973 |
| EP | 0 556 469 A1 | 8/1993 |

(Continued)

OTHER PUBLICATIONS

Maxon Precision Motors (http://machinedesign.com/motion-control/moving-coil-motor-technology), Feb. 26, 2009.*

(Continued)

*Primary Examiner* — Stephen Vu
(74) *Attorney, Agent, or Firm* — Cooley LLP

(57) ABSTRACT

A prosthetic finger, comprising: a first axis of movement comprising a moving magnet; a second axis of movement comprising a moving coil, wherein the second axis is generally orthogonal to the first axis; and a third axis of movement comprising a moving magnet, wherein the third axis of movement is generally oriented in the same direction as the first axis of movement.

10 Claims, 2 Drawing Sheets

(56) References Cited

U.S. PATENT DOCUMENTS

| | | | |
|---|---|---|---|
| 4,804,913 | A | 2/1989 | Shimizu et al. |
| 4,808,955 | A | 2/1989 | Godkin et al. |
| 4,858,452 | A | 8/1989 | Ibrahim |
| 5,051,635 | A | 9/1991 | Kasahara |
| 5,053,670 | A | 10/1991 | Kosugi |
| 5,111,088 | A | 5/1992 | Fujino |
| 5,160,865 | A | 11/1992 | Gururangan |
| 5,175,456 | A | 12/1992 | Neff et al. |
| 5,270,625 | A | 12/1993 | Neff |
| 5,317,222 | A | 5/1994 | Neff et al. |
| 5,446,323 | A | 8/1995 | Neff et al. |
| 5,476,324 | A | 12/1995 | Takei |
| 5,501,498 | A * | 3/1996 | Ulrich .............. 294/106 |
| 5,685,214 | A | 11/1997 | Neff et al. |
| 5,722,300 | A | 3/1998 | Burkhard et al. |
| 5,834,872 | A | 11/1998 | Lamb |
| 5,859,482 | A | 1/1999 | Crowell et al. |
| 5,893,646 | A | 4/1999 | Mizutani et al. |
| 5,952,589 | A | 9/1999 | Leung et al. |
| 6,091,167 | A | 7/2000 | Neff et al. |
| 6,118,360 | A | 9/2000 | Neff |
| 6,223,971 | B1 | 5/2001 | Sato |
| 6,439,103 | B1 | 8/2002 | Miller |
| 6,741,151 | B1 | 5/2004 | Livshitz et al. |
| 6,907,651 | B1 | 6/2005 | Fisher et al. |
| 6,997,077 | B2 | 2/2006 | Kollmann et al. |
| 7,053,583 | B1 | 5/2006 | Hazelton |
| 7,168,748 | B2 * | 1/2007 | Townsend et al. .......... 294/106 |
| 7,482,717 | B2 | 1/2009 | Hochhalter et al. |
| 8,083,278 | B2 * | 12/2011 | Yuan .............. 294/106 |
| 8,498,741 | B2 * | 7/2013 | Ihrke et al. ............ 700/245 |
| 2004/0076348 | A1 | 4/2004 | Dalessandro et al. |
| 2005/0211512 | A1 | 9/2005 | Fenwick |
| 2005/0253469 | A1 | 11/2005 | Hochhalter et al. |
| 2006/0023980 | A1 | 2/2006 | Kato et al. |
| 2006/0113847 | A1 | 6/2006 | Randall et al. |
| 2008/0258654 | A1 | 10/2008 | Neff |
| 2009/0040247 | A1 | 2/2009 | Cato et al. |
| 2009/0058198 | A1 | 3/2009 | Finkbeiner et al. |
| 2009/0058581 | A1 | 3/2009 | Neff et al. |
| 2009/0114052 | A1 | 5/2009 | Haniya et al. |
| 2009/0152960 | A1 | 6/2009 | Kimura et al. |
| 2009/0261663 | A1 | 10/2009 | Aso et al. |
| 2010/0005918 | A1 * | 1/2010 | Mizuno et al. .......... 74/490.03 |
| 2010/0133924 | A1 | 6/2010 | Neff et al. |
| 2010/0203249 | A1 | 8/2010 | Elgimiabi |
| 2010/0274365 | A1 * | 10/2010 | Evans et al. .............. 623/57 |
| 2011/0068595 | A1 | 3/2011 | Ihrke et al. |
| 2012/0043832 | A1 | 2/2012 | Neff et al. |
| 2012/0080960 | A1 | 4/2012 | Neff et al. |
| 2014/0159408 | A1 | 6/2014 | Neff et al. |
| 2014/0159513 | A1 | 6/2014 | Neff et al. |
| 2014/0159514 | A1 | 6/2014 | Neff et al. |
| 2015/0171723 | A1 | 6/2015 | Neff et al. |
| 2015/0303785 | A1 | 10/2015 | Neff et al. |
| 2016/0013712 | A1 | 1/2016 | Neff et al. |

FOREIGN PATENT DOCUMENTS

| | | |
|---|---|---|
| GB | 645281 A | 10/1950 |
| JP | 61-116964 A2 | 6/1986 |
| JP | 03285554 A | 12/1992 |
| JP | A 06-260332 | 9/1994 |
| JP | 07-131967 A | 5/1995 |
| JP | 2000-152592 A | 5/2000 |
| JP | 2001-238427 A | 8/2001 |
| JP | 2001-286121 A2 | 10/2001 |
| JP | 2005-020901 A | 1/2005 |
| JP | A 2005-080415 | 3/2005 |
| JP | 2008-048556 A | 2/2008 |
| JP | 2008-155302 A2 | 7/2008 |
| JP | 2008-193845 A2 | 8/2008 |
| JP | 2010-178614 A | 8/2010 |
| KR | 20-2011-0003488 | 4/2011 |
| WO | WO 2007/026566 A1 | 3/2007 |
| WO | WO 2007/063729 A1 | 6/2007 |
| WO | WO 2009/116343 A1 | 9/2009 |
| WO | WO 2011/088964 A1 | 7/2011 |

OTHER PUBLICATIONS

DC Motor Driver FundamentalsSemiconductor Components Industries, LLC, 2014, TND6041/D.
PCT/US2013/047727, International Search Report mailed Oct. 16, 2013, 3 pages.
PCT/US2013/047727, Written Opinion mailed Oct. 16, 2013, 4 pages.
PCT/US2013/047727, International Preliminary Report on Patentability mailed Dec. 31, 2014, 5 pages.
PCT/US2013/047728, International Search Report mailed Oct. 16, 2013, 3 pages.
PCT/US2013/047728, Written Opinion mailed Oct. 16, 2013, 6 pages.
PCT/US2013/047728, International Preliminary Report on Patentability mailed Dec. 31, 2014, 7 pages.
PCT/US2008/071988, International Search Report and Written Opinion mailed Nov. 3, 2008, 5 pages.
PCT/US2008/071988, International Preliminary Report on Patentability mailed Feb. 2, 2010, 5 pages.
PCT/US2008/052121, International Search Report and Written Opinion mailed Aug. 6, 2008, 5 pages.
PCT/US2008/052121, International Preliminary Report on Patentability mailed Jul. 28, 2009, 5 pages.
PCT/US2011/053070, International Search Report and Written Opinion mailed Feb. 16, 2012, 6 pages.
PCT/US2011/053070, International Preliminary Report on Patentability mailed Mar. 26, 2013, 5 pages.
Ep Application No. 14191347.5, Extended European Search Report dated May 4, 2015, 7 pages.
http://news.thomasnet.com/fullstory/455177, "Actuator and Ball Spline come in mini and micro sizes", 5 pages, Downloaded Aug. 7, 2015.
http://www.lunabearings.com/won.htm, "Compact Ball Spline", 6 pages, Downloaded Aug. 7, 2015.

* cited by examiner

ROBOTIC FINGER

CROSS REFERENCE TO RELATED APPLICATIONS

The present application claims the benefit of priority under 35 U.S.C. §119(e) of U.S. Provisional Application Ser. No. 61/664,091, entitled PROSTHETIC HAND, filed Jun. 25, 2012, and of U.S. Provisional Application Ser. No. 61/664,675, entitled PROSTHETIC HAND, filed due on Jun. 26, 2012, the contents of each of which are hereby incorporated by reference in their entirety for all purposes.

FIELD

This disclosure relates generally to prosthetics, and more particularly, to a prosthetic finger for a robotic hand with movement driven and controlled by moving coil or moving magnet actuators.

BACKGROUND

There are many tasks in the workplace today that are accomplished by human hands. Some tasks are very repetitive and cause carpal tunnel problems. Others take place in hazardous environments. Still others require extremely precise movements and are gradually becoming beyond the capability of humans. Prosthetic devices can be used to replace human hands in the above areas.

SUMMARY

The presently disclosed embodiments are directed to solving one or more of the problems presented in the prior art, as well as providing additional features that will become readily apparent by reference to the following detailed description when taken in conjunction with the accompanying drawings.

In one variation, a prosthetic finger comprises a first axis of movement, a second axis of movement, and a third axis of movement. The first axis of movement may be facilitated by a moving magnet. The second axis of movement may be facilitated by a moving coil, and the second axis may generally be orthogonal to the first axis. The third axis of movement may be facilitated by a moving magnet and the third axis of movement may generally be oriented in the same direction as the first axis of movement.

In another variation, a prosthetic finger comprises a distal elongate member, an intermediate elongate member, a proximal elongate member, and a plurality of actuators. The distal elongate member may comprise a distal tip and a proximal tip. The intermediate elongate member may comprise a proximal tip and a distal tip, and the proximal tip of the distal elongate member may be coupled to the distal tip of the intermediate elongate member. The proximal elongate member may comprise a distal tip, and the proximal tip of the intermediate elongate member may be coupled to the distal tip of the proximal elongate member. The plurality of actuators may move the distal elongate member in a first direction by a rotating moving magnet actuator, may move the distal elongate member in a second direction generally orthogonal to the first direction by a moving coil actuator, and move the intermediate elongate member in the first direction by a rotating moving magnet actuator.

It is to be understood that both the foregoing general description and the following detailed description are exemplary and are merely intended to provide further explanation of the subject matter.

BRIEF DESCRIPTION OF THE DRAWINGS

The features, nature and advantages of the present disclosure will become more apparent from the detailed description set forth below when taken in conjunction with the drawings in which like reference characters identify correspondingly throughout and wherein.

DETAILED DESCRIPTION

Figure 1:
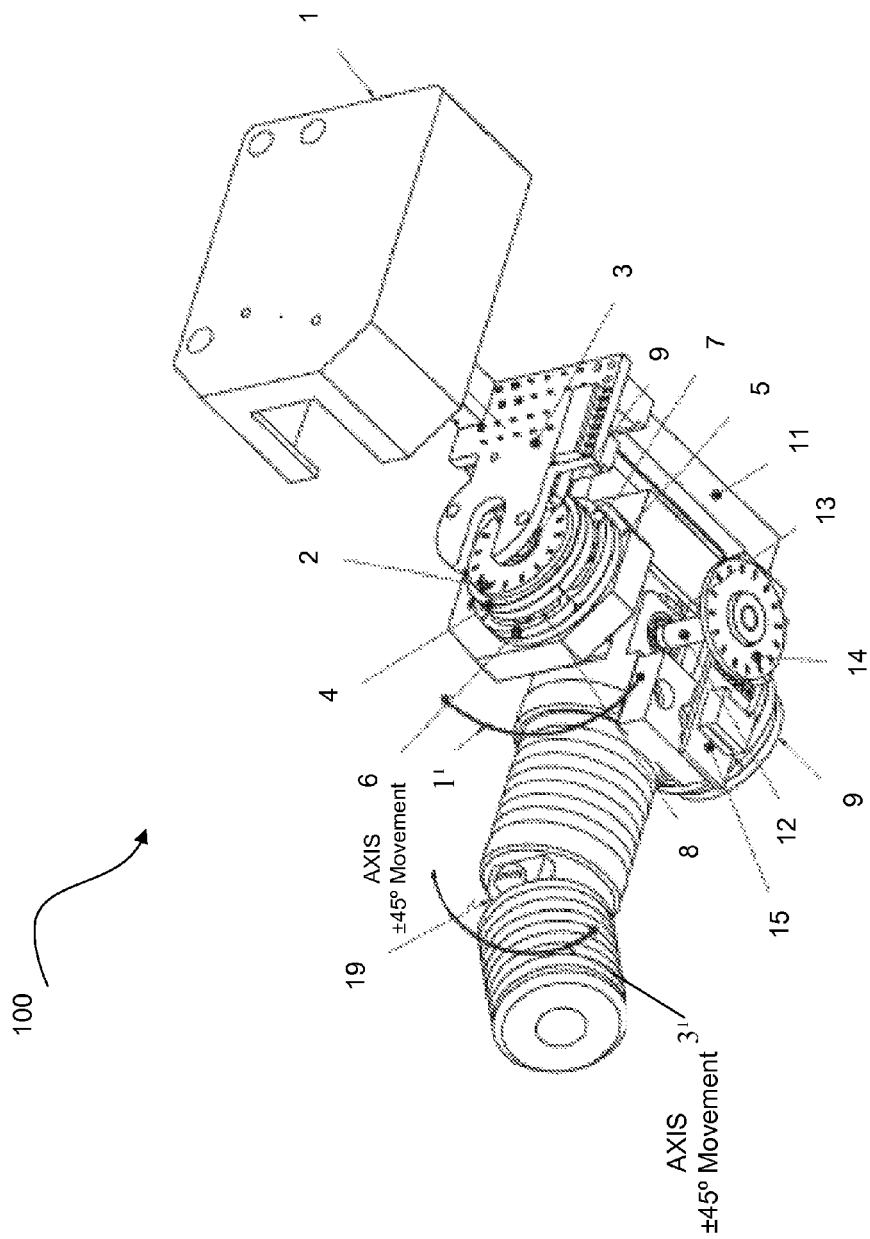
FIG. 1 illustrates a bottom view of a prosthetic finger in accordance with one embodiment of the invention.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

The word "exemplary" is used herein to mean "serving as an example or illustration." Any aspect or design described herein as "exemplary" is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure.

Reference will now be made in detail to aspects of the subject technology, examples of which are illustrated in the accompanying drawings, wherein like reference numerals refer to like elements throughout.

Disclosed herein are methods and systems for a robotic finger of a robotic hand, where the finger comprises at least three axes of movement driven by moving magnet or moving coil actuators. The use of moving magnet or moving coil actuators may provide a prosthetic device that better matches the movement and subtleties of the human hand.

In one variation, a prosthetic finger comprises a plurality of elongate members corresponding to one or more of the phalanges of a human finger. In some variations, a proximal, an intermediate, and a distal elongate member may correspond to a proximal, an intermediate, and a distal phalanx of a human finger. A distal tip of the proximal elongate member may be coupled to a proximal tip of the intermediate elongate member and a distal tip of the intermediate elongate member may be coupled to a proximal tip of the distal elongate member. The proximal elongate member may comprise a first and a second axis of movement. The intermediate elongate member may comprise a third axis of movement.

The first and second axis of movement of the proximal elongate member may be generally orthogonal. In some variations, the first axis of movement comprises a 100 degree range in a generally up and down plane. As used herein, the orientation of a prosthetic finger is taken so that the hand is prone, that is, the hand lies in a generally horizontal plane. The first axis may use a rotating moving magnet actuator. In some variations, 24 or 48 DC power supplies are utilized for the rotating moving magnet actuator. The moving magnet design may have 4 magnets per side, located on 2 steel shafts projected out of the moving shaft. Static coils may be located in the static housing. In some variations, the coils may be designed so that a movement range of 100 degrees is achieved with a single pole. In other variations, a multipole arrangement may be arranged. The single pole may be easier to control, but the multipole may have a higher torque capability. A rotary encoder may be attached to one of the moving magnet discs. A rotary encoder reader head may be mounted opposite it on the static housing. This allows the rotary moving magnet motor to be used in servo mode. The rotating moving magnet actuator may be a direct drive actuator.

This arrangement may allow for programmable control of speed, position, and torque—which translates into force. In addition, this arrangement may have the benefit of eliminating moving cables since the coils and reader head are static.

The second axis of movement may comprise a 20 degree range in a side to side plane. The 20-degree angle may be accomplished by attaching a moving coil to the rear of the shaft associated with the first axis. The coil may move inside a magnet housing that is statically located in the static housing. The coil may be wound on a bobbin that has an inner opening large enough so that it clears the center pole even though the coil moves in a 20 degree arc. This may keep the moving mass of the moving shaft low since the magnet housing in not included. The second axis of movement may comprise an encoder, similar to the encoder discussed above with respect to the first axis of movement. The moving coil actuator may be a direct drive actuator.

Combining the first and second axis on the proximal elongate member results in the member being able to rotate 100 degrees about the first axis and pivot 20 degrees about the second axis. This range may simulate the positive and negative inflexion that results from muscle contraction in the human hand.

The third axis of movement of the intermediate elongate member may be oriented generally in the same direction as the first axis of the proximal elongate member. In some variations, the third axis of movement comprises a 100 degree range in a generally up and down plane. In some variations, the third axis of movement comprises a rotating moving magnet actuator similar to the rotating moving magnet actuator and encoder of the first axis of movement.

By using actuators, variations of the prosthetic finger can take advantage of the programmable force and object detection processes of actuators. The result may be a finger that more closely matches human finger capabilities and has additional useful features. Such additional features may include precise and measurable force control, position control, and speed control.

In some variations, cabling management is done in the following manner. The third axis has 8 lines—6 for encoder and 2 for power. The moving shaft operated by the first and second axes has a hole thru the center. The third axis cable runs thru this hole and terminates on to a connector board. The second axis also has wiring that feeds thru the hole. All the wiring terminates onto a connector board. A flex cable running 16 lines connects the second and third axes' wires to a connector board statically mounted on the first axis. Male connectors on the board enable all axes to be connected to a separately mounted 3 axis servo controller.

In some variations, integrated springs are added to partially counterbalance heavy masses and return axis joints to a determined retracted or extended position when power is cut to the prosthetic finger.

In some variations, the moving magnet and moving coil elements are equipped with appropriately placed steel or magnets to achieve permanent "drag" for each axis. This means that each axis will remain in position when power is cut or reduced.

In some variations, a suction pump is added to provide picking capabilities. A vacuum channel can be run thru the open internal diameters of the shafts.

Figure 2:
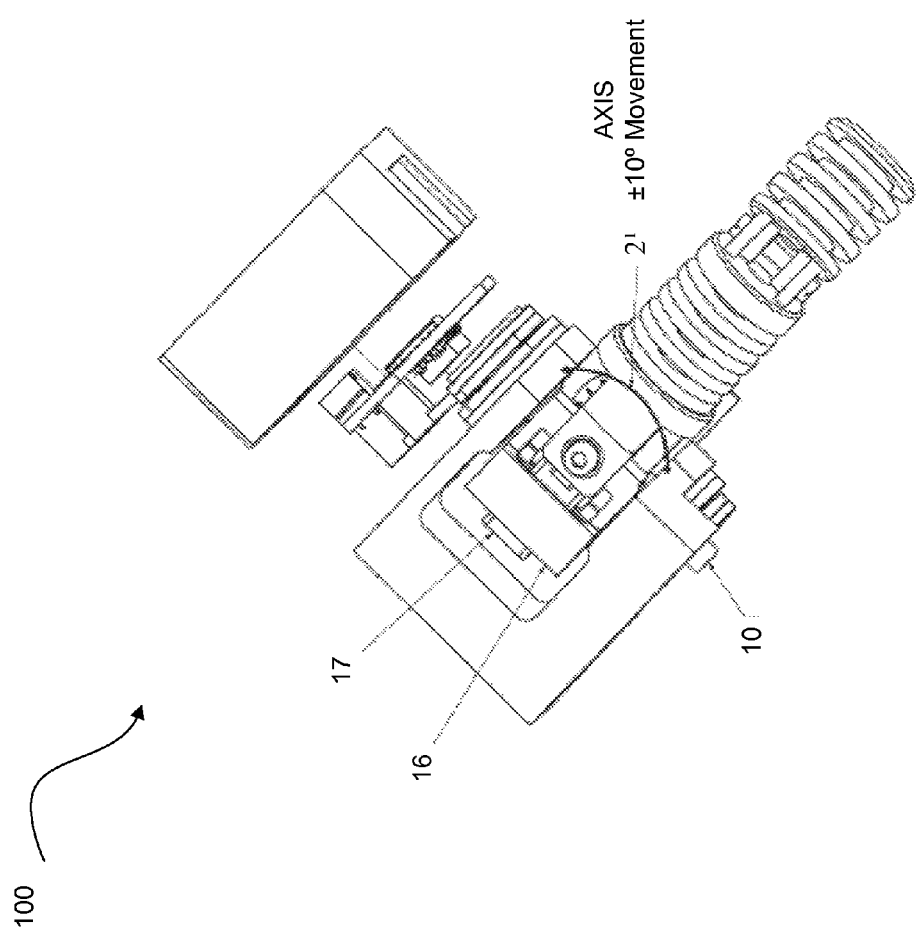
FIG. 2 illustrates a top view of the prosthetic finger of FIG. 1.

FIG. 1 illustrates a bottom view of a prosthetic finger 100 in accordance with one embodiment. Prosthetic finger 100 includes three axes of movement—axis 1', axis 2', and axis 3'—similar to prosthetic finger described above. Although axis 1', axis 2', and axis 3' are illustrated as providing ranges of ±45 degrees, ±10 degrees, and ±45 degrees, respectively, other variations may have different ranges. Prosthetic finger 100 includes a cover 1, axis1 encoder code disk 2, axis1 encoder reader head 3, axis1 first magnet plate 4, axis1 second magnet plate 5, axis1 motor coil 6, axis1 coil bobbin 7, axis1 permanent magnet 8, axis1 rotary bearings 9, axis1 pivot shaft 10, a housing 11, axis2 pivot shaft 12, axis2 rotary bearings 13, axis2 encoder code disk 14, axis2 encoder reader head 15, axis2 linear angular motor 16, axis2 linear motor coil assembly 17, and an axis 3 a motor 19. FIG. 2 illustrates a top view of the prosthetic finger 100 of FIG. 1.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

We claim:

1. A prosthetic finger, comprising:
a first axis of movement comprising a moving magnet wherein the first axis of movement further comprises a coil arranged around a coil bobbin and a permanent magnet;
a second axis of movement comprising a moving coil, wherein the second axis is generally orthogonal to the first axis; and
a third axis of movement comprising a moving magnet, wherein the third axis of movement is generally oriented in the same direction as the first axis of movement.

2. A prosthetic finger, comprising:
a first axis of movement comprising a moving magnet wherein the first axis of movement further comprises rotary bearings and a pivot shaft;
a second axis of movement comprising a moving coil, wherein the second axis is generally orthogonal to the first axis; and
a third axis of movement comprising a moving magnet, wherein the third axis of movement is generally oriented in the same direction as the first axis of movement.

3. A prosthetic finger, comprising:
a first axis of movement comprising a moving magnet;
a second axis of movement comprising a moving coil, wherein the second axis is generally orthogonal to the first axis and wherein the second axis of movement further comprises an encoder code disk and an encoder read head; and
a third axis of movement comprising a moving magnet, wherein the third axis of movement is generally oriented in the same direction as the first axis of movement.

4. A prosthetic finger, comprising:
a first axis of movement comprising a moving magnet;
a second axis of movement comprising a moving coil, wherein the second axis is generally orthogonal to the first axis and wherein the second axis of movement includes a linear angular motor and a linear motor coil assembly; and
a third axis of movement comprising a moving magnet, wherein the third axis of movement is generally oriented in the same direction as the first axis of movement.

5. A prosthetic finger, comprising:
a first axis of movement comprising a moving magnet wherein the first axis of movement further comprises an encoder read head and a rotary encoder code disk attached to a first magnet plate;
a second axis of movement comprising a moving coil, wherein the second axis is generally orthogonal to the first axis; and
a third axis of movement comprising a moving magnet, wherein the third axis of movement is generally oriented in the same direction as the first axis of movement.

6. The prosthetic finger of claim 5 wherein the first axis of movement further comprises a second magnet plate.

7. A prosthetic finger, comprising:
a distal elongate member comprising a distal tip and a proximal tip;
an intermediate elongate member comprising a proximal tip and a distal tip, wherein the proximal tip of the distal elongate member is coupled to the distal tip of the intermediate elongate member;
a proximal elongate member comprising a distal tip, wherein the proximal tip of the intermediate elongate member is coupled to the distal tip of the proximal elongate member; and
a plurality of actuators, wherein the distal elongate member is moved in a first direction by a rotating moving magnet actuator, wherein the distal elongate member is moved in a second direction generally orthogonal to the first direction by a moving coil actuator, wherein the intermediate elongate member is moved in the first direction by a rotating moving magnet actuator, and wherein the moving coil actuator causes the proximal elongate member to move in the second direction.

8. A prosthetic finger, comprising:
a distal elongate member comprising a distal tip and a proximal tip;
an intermediate elongate member comprising a proximal tip and a distal tip, wherein the proximal tip of the distal elongate member is coupled to the distal tip of the intermediate elongate member;
a proximal elongate member comprising a distal tip, wherein the proximal tip of the intermediate elongate member is coupled to the distal tip of the proximal elongate member; and
a plurality of actuators, wherein the distal elongate member is moved in a first direction by a rotating moving magnet actuator, wherein the distal elongate member is moved in a second direction generally orthogonal to the first direction by a moving coil actuator, wherein the intermediate elongate member is moved in the first direction by a rotating moving magnet actuator, and wherein the moving coil actuator includes an encoder code disk and an encoder read head.

9. A prosthetic finger, comprising:
a distal elongate member comprising a distal tip and a proximal tip;
an intermediate elongate member comprising a proximal tip and a distal tip, wherein the proximal tip of the distal elongate member is coupled to the distal tip of the intermediate elongate member;
a proximal elongate member comprising a distal tip, wherein the proximal tip of the intermediate elongate member is coupled to the distal tip of the proximal elongate member; and a plurality of actuators, wherein the distal elongate member is moved in a first direction by a rotating moving magnet actuator, wherein the distal elongate member is moved in a second direction generally orthogonal to the first direction by a moving coil actuator, wherein the intermediate elongate member is moved in the first direction by a rotating moving magnet actuator, and wherein the moving coil actuator includes a linear angular motor and a linear motor coil assembly.

10. A prosthetic finger, comprising:

a distal elongate member;

an intermediate elongate member coupled to the distal elongate member;

a proximal elongate member coupled to the intermediate elongate member;

a first rotating moving magnet actuator which moves the proximal elongate member in a first direction;

a moving coil actuator which moves the proximal elongate member in a second direction generally orthogonal to the first direction wherein the moving coil actuator further comprises an encoder code disk and an encoder read head; and a second rotating moving magnet actuator which moves the intermediate elongate member in the first direction.

* * * * *